(12) United States Patent
Kim et al.

(10) Patent No.: US 11,091,025 B2
(45) Date of Patent: Aug. 17, 2021

(54) FAN SHROUD FOR MOTOR VEHICLE

(71) Applicant: Hanon Systems, Daejeon (KR)

(72) Inventors: Jong Yeol Kim, Daejeon (KR); Dae Suk Park, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 101 days.

(21) Appl. No.: 16/431,865

(22) Filed: Jun. 5, 2019

(65) Prior Publication Data

US 2019/0283568 A1     Sep. 19, 2019

Related U.S. Application Data

(62) Division of application No. 15/858,200, filed on Dec. 29, 2017, now Pat. No. 10,350,988, which is a division of application No. 15/016,434, filed on Feb. 5, 2016, now Pat. No. 9,902,255.

(30) Foreign Application Priority Data

Feb. 6, 2015   (KR) .................. 10-2015-0018690
Aug. 27, 2015  (KR) .................. 10-2015-0121102

(51) Int. Cl.
*B60K 11/08*    (2006.01)
*F01P 11/10*    (2006.01)
*F01P 7/10*     (2006.01)
*B60K 11/02*    (2006.01)

(52) U.S. Cl.
CPC ............. *B60K 11/08* (2013.01); *B60K 11/02* (2013.01); *F01P 7/10* (2013.01); *F01P 11/10* (2013.01)

(58) Field of Classification Search
CPC ............. B60H 1/249; B60H 1/00842; B60H 1/00678; B60H 1/00021; B60H 1/00671; B60H 2001/00092; B60H 2001/00721; B60H 2001/00707; B60S 1/023; F01P 11/10; F01P 7/10; B60K 11/085
See application file for complete search history.

(56) References Cited

U.S. PATENT DOCUMENTS

| 5,106,018 A | 4/1992 | Loup |
| 5,660,149 A | 8/1997 | Lakerdas et al. |
| 5,727,999 A | 3/1998 | Lewis |
| 6,106,228 A | 8/2000 | Bartlett |
| 6,532,909 B2 | 3/2003 | Stauder et al. |
| 7,156,615 B2 | 1/2007 | Horski et al. |
| 8,128,358 B2 | 3/2012 | McLennan |

(Continued)

FOREIGN PATENT DOCUMENTS

| JP | 2004257362 A | 9/2004 |
| JP | 2005307921 A | 11/2005 |
| JP | 2008286113 A | 11/2008 |

*Primary Examiner* — Emma K Frick
(74) *Attorney, Agent, or Firm* — Shumaker, Loop & Kendrick, LLP; James D. Miller

(57) ABSTRACT

A valve for a cooling assembly of a vehicle is capable of improving air-blowing efficiency through rotation of a fan at the time of stopping the vehicle and improving heat-exchange efficiency of a heat exchanger provided in an engine room of the vehicle through an increase in an amount of introduced driving wind at the time of driving the vehicle by including a valve assembly controlling introduction and discharge of the driving wind. The valve assembly is capable of preventing deterioration of wind-amount performance due to leakage of air by blocking a gap generated between the shroud and the valve assembly to minimize air leaked through the gap.

7 Claims, 12 Drawing Sheets

(56) References Cited

U.S. PATENT DOCUMENTS

| | | |
|---|---|---|
| 8,261,410 B2 | 9/2012 | Sze |
| 8,662,840 B2 | 3/2014 | Cote |
| 8,955,542 B2 | 2/2015 | Kiezulas |
| 9,097,353 B2 | 8/2015 | Loewe |
| 9,410,629 B2 | 8/2016 | Carlson et al. |
| 2006/0101738 A1 | 5/2006 | Lethers et al. |
| 2007/0119395 A1 | 5/2007 | Nagano et al. |
| 2007/0293135 A1 | 12/2007 | Hori et al. |
| 2008/0309122 A1 | 12/2008 | Smith et al. |
| 2009/0130968 A1 | 5/2009 | Harich et al. |
| 2011/0132677 A1 | 6/2011 | Kawahira |
| 2012/0003907 A1 | 1/2012 | Carlson et al. |
| 2012/0100791 A1 | 4/2012 | Charnesky et al. |
| 2012/0111652 A1 | 5/2012 | Charnesky et al. |
| 2013/0305609 A1 | 11/2013 | Graves |
| 2014/0086722 A1 | 3/2014 | Liedel et al. |
| 2014/0199933 A1 | 7/2014 | Wissmueller et al. |
| 2015/0118043 A1 | 4/2015 | Spaggiari |
| 2015/0176605 A1 | 6/2015 | Pegues et al. |
| 2015/0345810 A1 | 12/2015 | Jones |
| 2017/0297413 A9 | 10/2017 | Wisniewski et al. |

FAN SHROUD FOR MOTOR VEHICLE

CROSS-REFERENCE TO RELATED APPLICATIONS

This patent application is a divisional patent application of U.S. patent application Ser. No. 15/858,200 filed Dec. 29, 1017 which is a divisional patent application of U.S. patent application Ser. No. 15/016,434 filed Feb. 5, 2016 which claims priority under 35 U.S.C. § 119 to Korean Patent Application No. 10-2015-0018690 filed on Feb. 6, 2015 and Korean Patent Application No. 10-2015-0121102 filed on Aug. 27, 2015 in the Korean Intellectual Property Office, the disclosure of each of which is incorporated herein by reference in its entirety.

TECHNICAL FIELD

The following disclosure relates to a cooling assembly for a vehicle. More particularly, the following disclosure relates to a cooling assembly for a vehicle that is capable of improving air-blowing efficiency through rotation of a fan at the time of stopping the vehicle, and improving heat-exchange efficiency of a heat exchanger provided in an engine room of the vehicle through an increase in an amount of introduced driving wind at the time of driving the vehicle by including a valve assembly controlling introduction and discharge of the driving wind. The cooling assembly is further capable of preventing deterioration of wind-amount performance due to leakage of air by blocking a gap generated between the shroud and the valve assembly to minimize air leaked through the gap.

BACKGROUND

Generally, an engine room of a vehicle is provided with an engine, a cooling device for cooling the engine, an air-conditioning device, and the like. The cooling device, which is to cool the engine of the vehicle, is configured to include a radiator for cooling a coolant of the engine and a cooling assembly generating an air flow to the radiator to improve heat radiation efficiency of a surface of the radiator, thereby further promoting cooling efficiency of the coolant.

The cooling assembly is configured to blow air to an air cooling type heat exchanger such as the radiator, a condenser, or the like, of the vehicle in order to promote heat radiation of the air cooling type heat exchanger, and is classified into a pusher-type cooling assembly and a puller-type cooling assembly depending on a position in which the heat exchanger is disposed.

The pusher-type cooling assembly is a type in which an axial-flow fan is disposed in front of the heat exchanger in the vehicle to forcibly blow air from the front of the vehicle toward the rear of the vehicle. Since air-blowing efficiency of the pusher-type cooling assembly for the heat exchanger is low, the pusher-type cooling assembly is used in the case in which a margin space behind the heat exchanger within the engine room is narrow. On the other hand, the puller-type cooling assembly is a type in which an axial-flow fan is disposed behind the heat exchanger in the vehicle to pull air in front of the heat exchanger in the vehicle, thereby allowing the air to pass through the heat exchanger. Since air-blowing efficiency of the puller-type cooling assembly is relatively higher than that of the pusher-type cooling assembly, the puller-type cooling assembly has been used in most of vehicles.

A perspective view of a cooling assembly F for a vehicle according to the related art is illustrated in FIG. 1, and a front view of the cooling assembly F for a vehicle according to the related art is illustrated in FIG. 2.

Referring to FIGS. 1 and 2, the cooling assembly F is configured to be fixed to a rear end of a heat exchanger in order to introduce cooled air into the heat exchanger, comprises an assembly of a fan 10 and a shroud 30. The cooling assembly F is configured to include the fan 10 for blowing air, a motor 20 for driving the fan 10. The shroud 30 includes a body 31 having a vent hole formed at the center thereof and a motor fixing part 32 fixing and supporting the motor 20 disposed at the center of the vent hole. The motor fixing part 32 is supported and formed by a plurality of stators 33 extended from a plurality of points of an inner peripheral surface of the vent hole in a centrifugal direction.

The cooling assembly F for a vehicle according to the related art having the configuration as described above has an advantage that cooling performance of the heat exchanger may be improved using forcible air-blowing by rotation of the fan 10 at the time of stopping the vehicle, but has a disadvantage that a portion other than the vent hole on the body 31 is closed at the time of driving the vehicle, such that introduction of the driving wind is hindered by a closed area on the body 31, thereby deteriorating cooling performance of the heat exchanger.

A technology related to a cooling assembly in which an air inlet is formed in a closed portion on the body 31 has been disclosed in order to solve the problem as described above. However, in this technology, air blown to the heat exchanger through rotation of the fan flows backward through the air inlet at the time of stopping the vehicle at which the driving wind is not generated, such that cooling performance of the heat exchanger is deteriorated.

SUMMARY

An embodiment of the present disclosure is directed to providing a cooling assembly for a vehicle including a valve assembly formed on a closed surface of a body other than a vent hole of the cooling assembly, the closing means is configured for controlling introduction and discharge of the driving wind. The cooling assembly is maintained in a closed state at the time of stopping the vehicle to improve air-blowing efficiency, and opened at the time of driving the vehicle to improve introduction efficiency of the driving wind.

Particularly, an embodiment of the present disclosure is directed to providing a cooling assembly for a vehicle capable of reducing assembly time by configuring a door so as to be coupled onto the body of the cooling assembly in a one-touch scheme, and improving assembly quality by using a structure in which the door may not be assembled in a reverse direction.

In addition, an embodiment of the present disclosure is directed to providing a cooling assembly for a vehicle capable of preventing deterioration of wind amount performance due to leakage of air by blocking a gap generated between a shroud and a valve assembly to minimize the air leaked through the gap.

In one general aspect, a cooling assembly for a vehicle includes: a fan for blowing air; a motor for driving the fan; a shroud including a body, the body having a vent hole formed at the center thereof and a motor fixing part coupling and supporting the motor disposed at the center of the vent hole. The motor fixing part is supported and formed by a plurality of stators extended from a plurality of points of an inner peripheral surface of the vent hole in a centrifugal direction. A valve assembly is provided on the body and is configured to control introduction of the driving wind depending on whether or not the vehicle is driven. The valve assembly includes an air introduction part opened and formed on the body so that the driving wind is introduced into a heat exchanger. The valve assembly further includes a door part including a shaft coupled to an upper portion of the air introduction part so as to be freely rotatable in order to control the introduction of the driving wind depending on whether or not the vehicle is driven, and a door coupled to the shaft and configured to close or open the air introduction part by rotation of the shaft.

In the door part, the door may be provided on a surface of the body toward the rear of the vehicle so as to be opened toward the rear of the vehicle, and may have a cross-sectional area larger than that of the air introduction part to prevent passage of the door through an air introduction hole of the air introduction part, wherein the door cannot be opened toward the front of the vehicle.

The air introduction part may include a first rotation coupling part and a second rotation coupling part. The first rotation coupling part is formed in a closed ring shape so that a first end of the shaft is fitted thereinto in an axial direction. The second rotation coupling part is formed in a partial ring shape having an opening part formed so that a second end of the shaft is fitted thereinto in a radial direction. A distance across the opening part may be smaller than a diameter of the shaft.

A door contact part is configured to contact a surface of the door toward the front of the vehicle when the door part is in a closed position. The door contact part may be formed along a perimeter surface of the air introduction hole so as to protrude toward the rear of the vehicle. The door contact part may include side surface contact parts each formed at an incline with respect to a length direction of the vehicle. The side surface contact parts are formed at opposing sides of the air introduction hole. A lower contact part is formed in a width direction of the vehicle at a lower portion of the vehicle, and span a distance between the side surface contact parts. The side surface contact parts may have a protrusion length that becomes long toward the lower portion of the vehicle so that the door is closed in a state in which a lower end portion of the door is inclined toward the rear of the vehicle.

The first rotation coupling part may be provided with a stopper limiting rotation of the door so that the door is not opened beyond a predetermined angle.

A head part having a diameter larger than that of the shaft may be formed at the second end of the shaft, and the diameter of the head part is larger than an inner diameter of the first rotation coupling part.

The cooling assembly may further include a blocking part extended from the body in a downward direction so as to enclose an upper portion of the door part toward the front of the vehicle. The blocking part may be extended in the downward direction so that a first linear distance from the center of the shaft to a distal portion of the blocking part at the front of the vehicle is smaller than a second linear distance from the center of the shaft to the uppermost end of the blocking part at the rear of the vehicle.

DETAILED DESCRIPTION OF MAIN ELEMENTS

Figure 1:
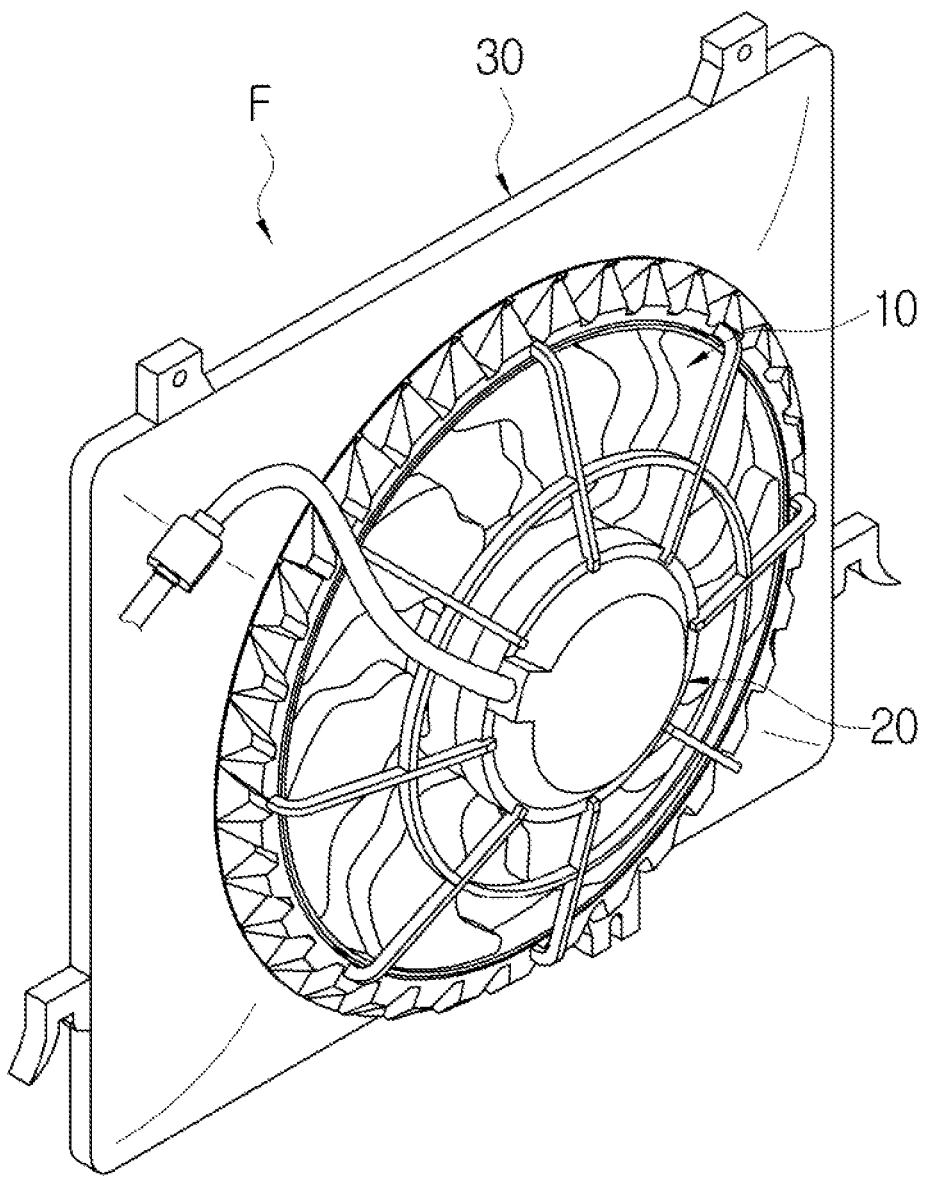
FIG. 1 is a perspective view of a cooling assembly for a vehicle according to the prior art.
Figure 2:
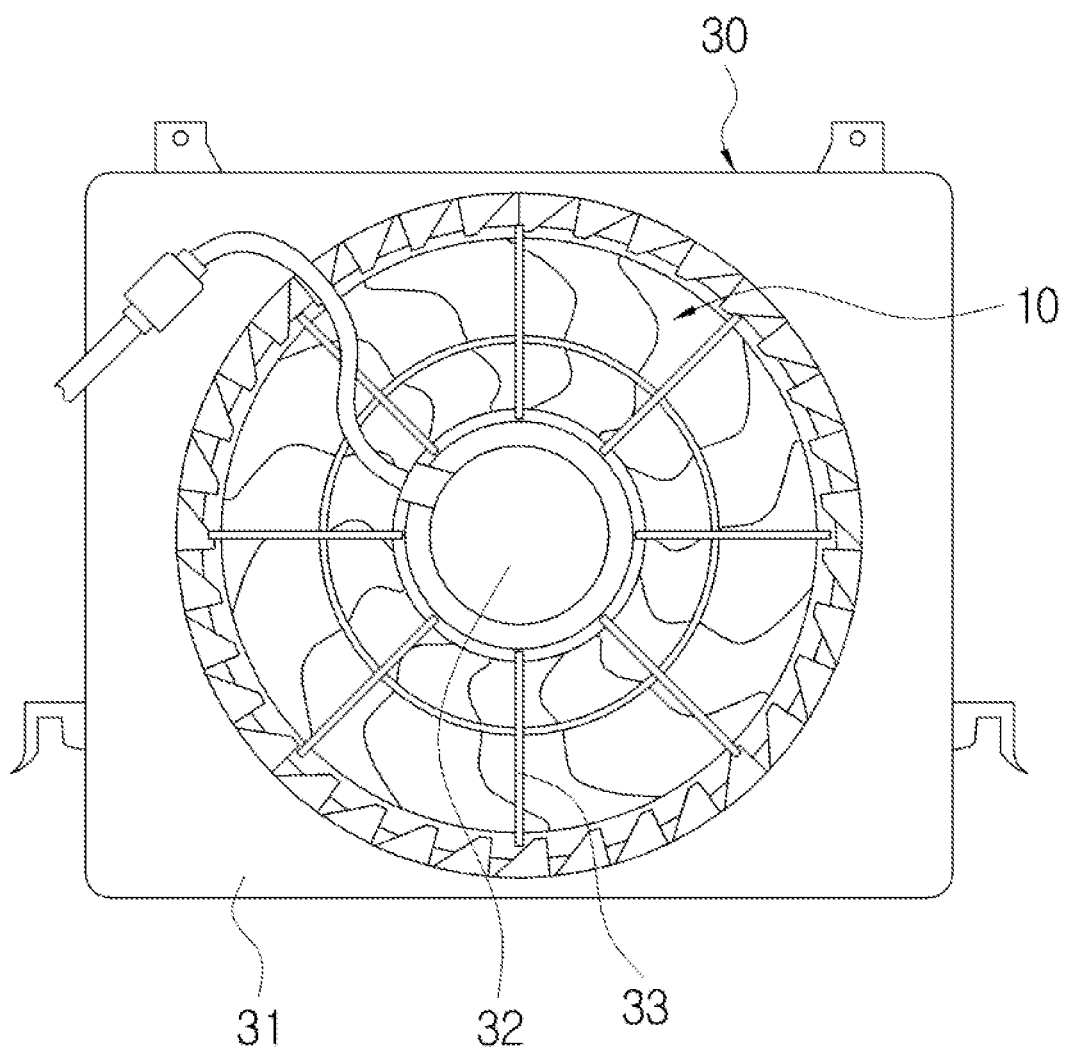
FIG. 2 is a front view of the cooling assembly for a vehicle according to the prior art.

1000: cooling assembly for vehicle
100: shroud
111: body
112: motor fixing part
113: stator
114: fan
115: motor
116: vent hole
200: valve assembly
210: air introduction part
210a: door protecting part
211: air introduction hole
212: door contact part
212a: side surface contact part
212b: lower contact part
213: first rotation coupling part
214: second rotation coupling part
215: stopper
216: opening part
220: door part
221: door
222: shaft
223: head part
230: blocking part

DETAILED DESCRIPTION OF EMBODIMENTS

Hereinafter, a cooling assembly for a vehicle according to an embodiment of the present disclosure will be described in detail with reference to the accompanying drawings.

Figure 3:
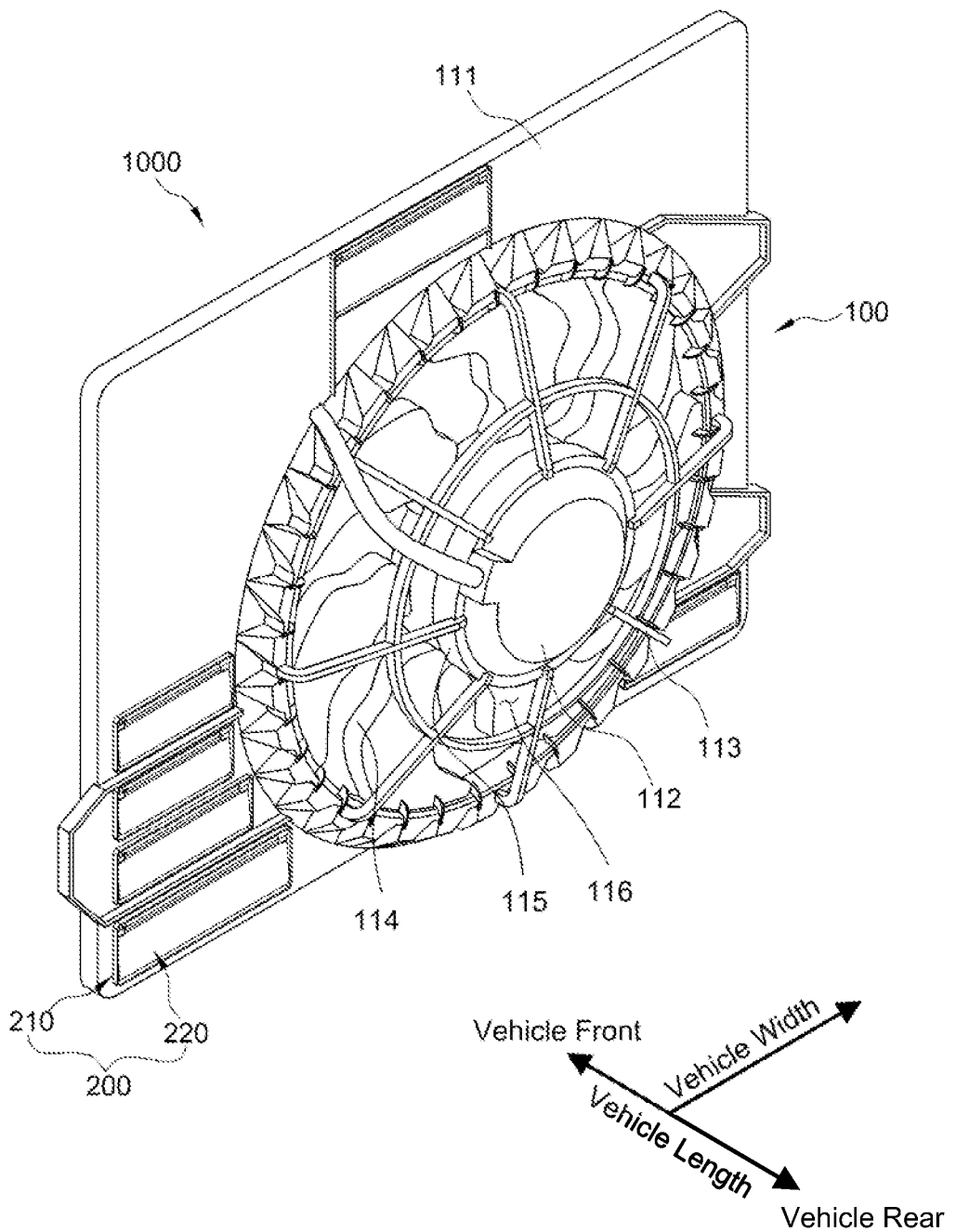
FIG. 3 is a front perspective view of a cooling assembly for a vehicle according to an embodiment of the present disclosure.
Figure 4:
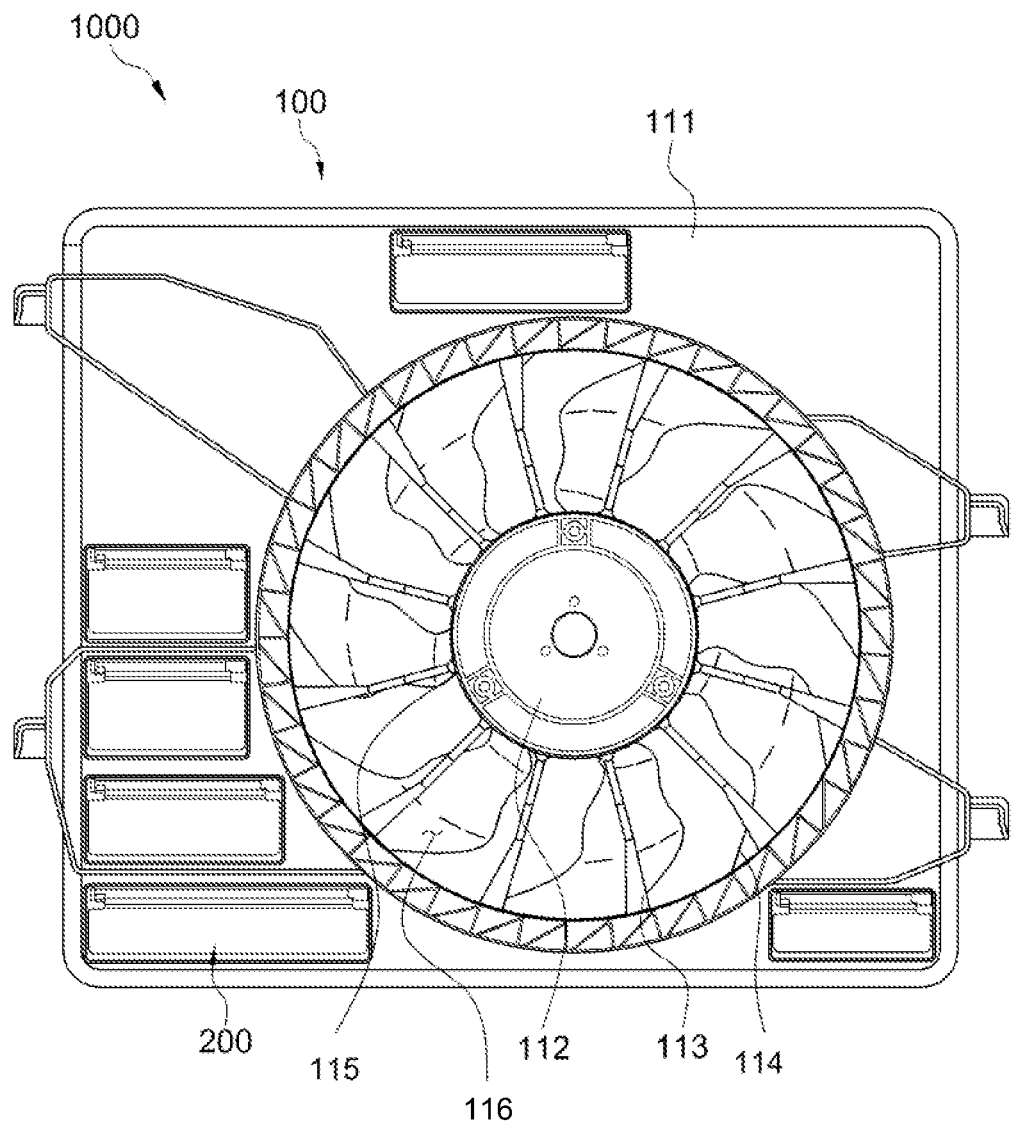
FIG. 4 is a front view of the cooling assembly shown in FIG. 3.

An entire perspective view of a cooling assembly 1000 for a vehicle according to an embodiment of the present disclosure is illustrated in FIG. 3, and a front view of the cooling assembly 1000 for the vehicle is illustrated in FIG. 4.

As illustrated in FIGS. 3 and 4, the cooling assembly 1000 is configured to be fixed to a rear end of a heat exchanger (not shown) for the vehicle in order to introduce cooled air into the heat exchanger, and is configured to include a fan 114 for blowing air, a motor 115 for driving the fan 114, and a shroud 100. The shroud 100 includes a body 111 having a vent hole 116 formed at the center thereof, and a motor fixing part 112 for fixing and supporting the motor 115 disposed at the center of the vent hole 116. The motor fixing part 112 is supported and formed by a plurality of stators 113 extended from a plurality of points of an inner peripheral surface of the vent hole 116, in a centrifugal direction. Since the fan 114 according to the present disclosure may be an axial-flow fan 114 that is generally used, a detailed description for the fan 114 will be omitted.

The motor 115, which is a driving source, allows air to be blown by rotating the fan 114 in the in order to cool a heat exchange medium passing through an inner portion of the heat exchanger for a vehicle. The motor 115 may be powered by general direct current (DC) or alternating current (AC).

The shroud 100 is configured to guide the air blown by the rotation of the fan 114, and is fixed to the heat exchanger for the vehicle in a state in which it supports the motor 115.

The shroud 100 has the vent hole 116 formed at the center thereof in order to guide the blown air in an axial direction. The body 111 of the shroud 100 has a quadrangular shape corresponding to a shape of the heat exchanger, so that a rear surface of the shroud 100 may contact the entire opposing surface of the heat exchanger. The body 111 of the shroud 100 is formed of a synthetic resin. Here, the vent hole 116 of the shroud 100 may be formed in a circular shape in order to reduce wind pressure loss to improve air-blowing efficiency of the fan 114.

In addition, the shroud 100 is provided with the motor fixing part 112 for coupling and supporting the motor 115 disposed at the center of the vent hole 116. The motor fixing part 112 is supported and formed by the plurality of stators 113 extended from the plurality of points of the inner peripheral surface of the vent hole 116 in the centrifugal direction.

Figure 10:
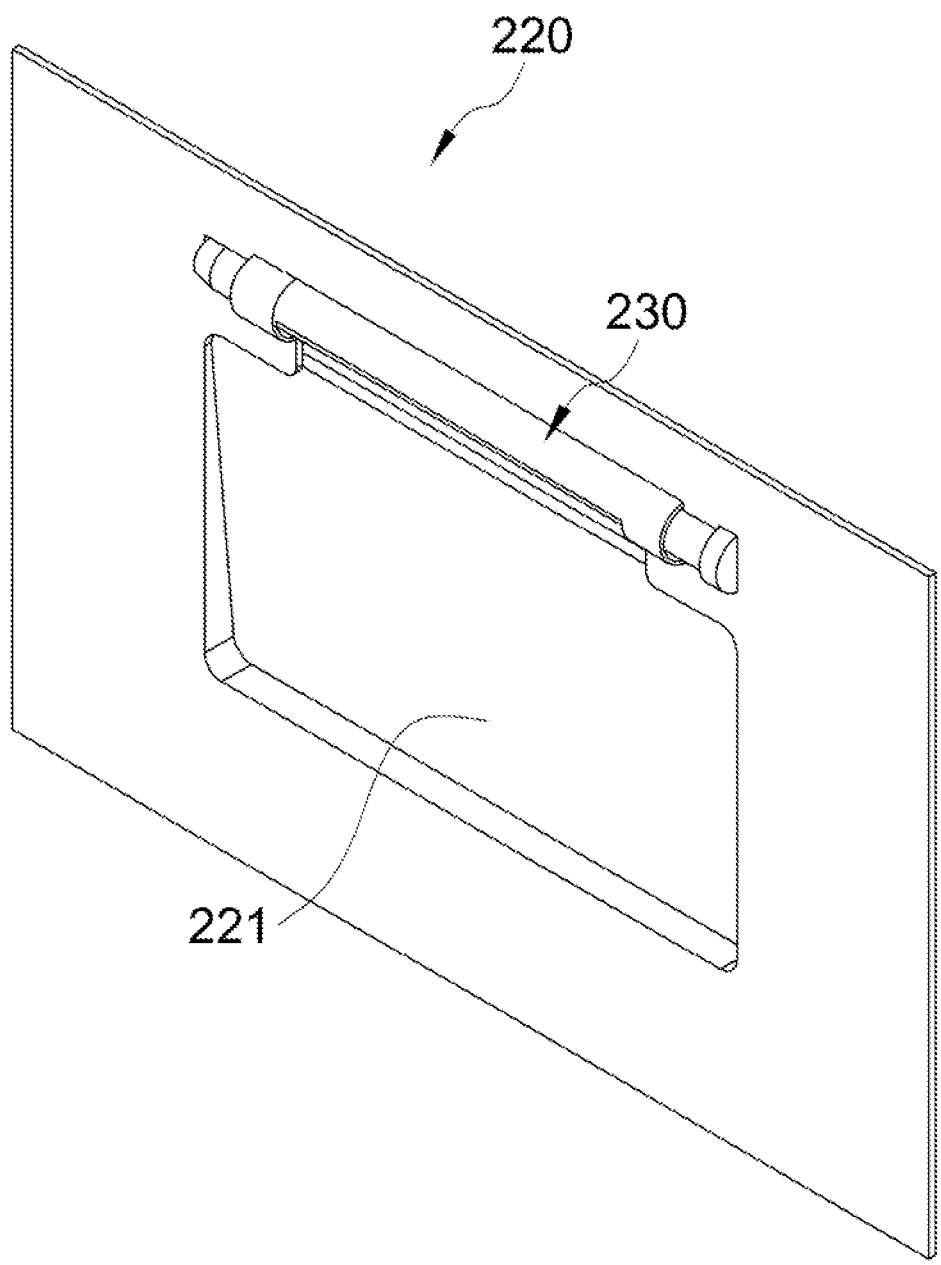
FIG. 10 is a front perspective view of the valve assembly of FIG. 5, wherein a door part is in a closed position.
Figure 11:
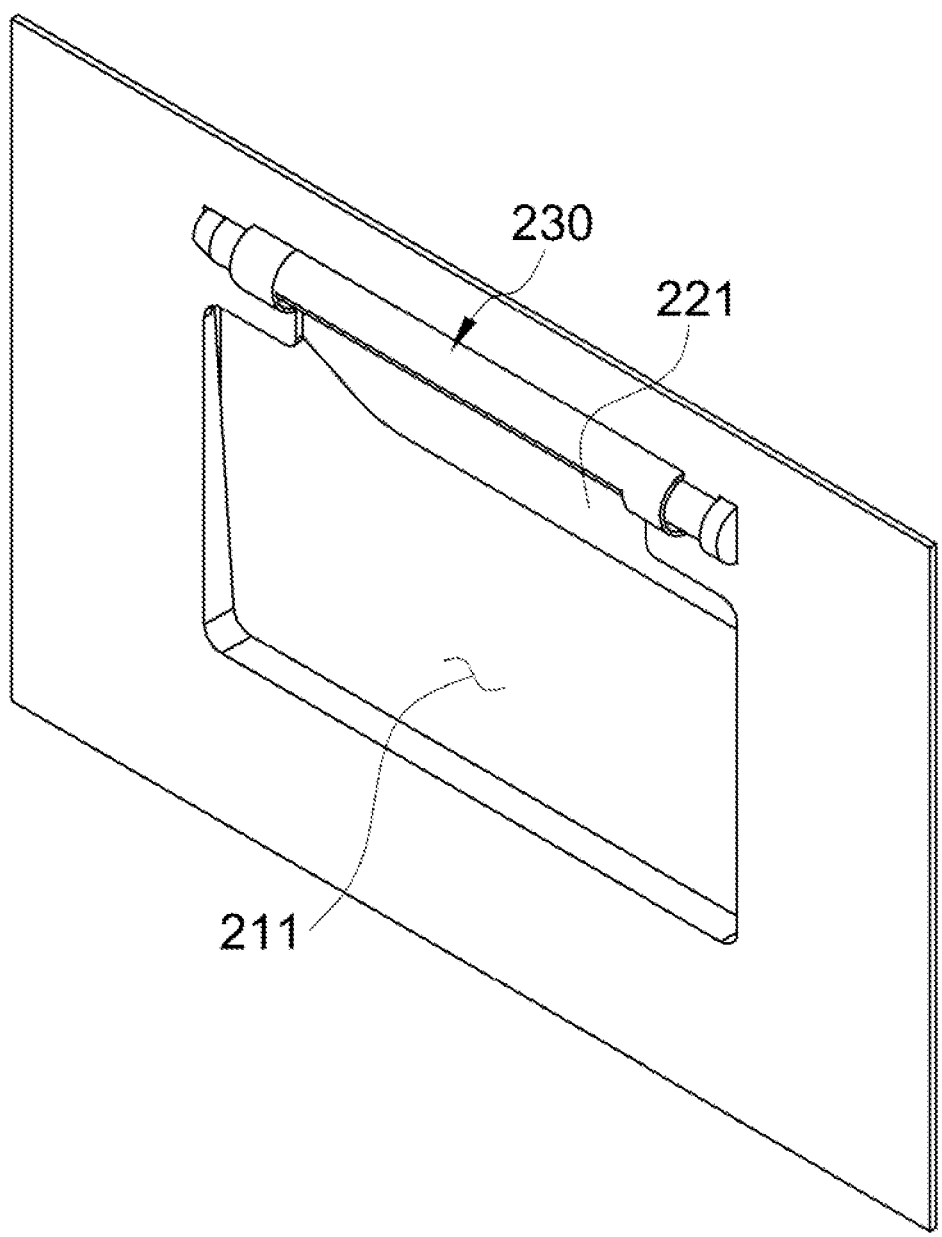
FIG. 11 is a front perspective view of the valve assembly of FIG. 5, wherein a door part is in an open position.
Figure 12:
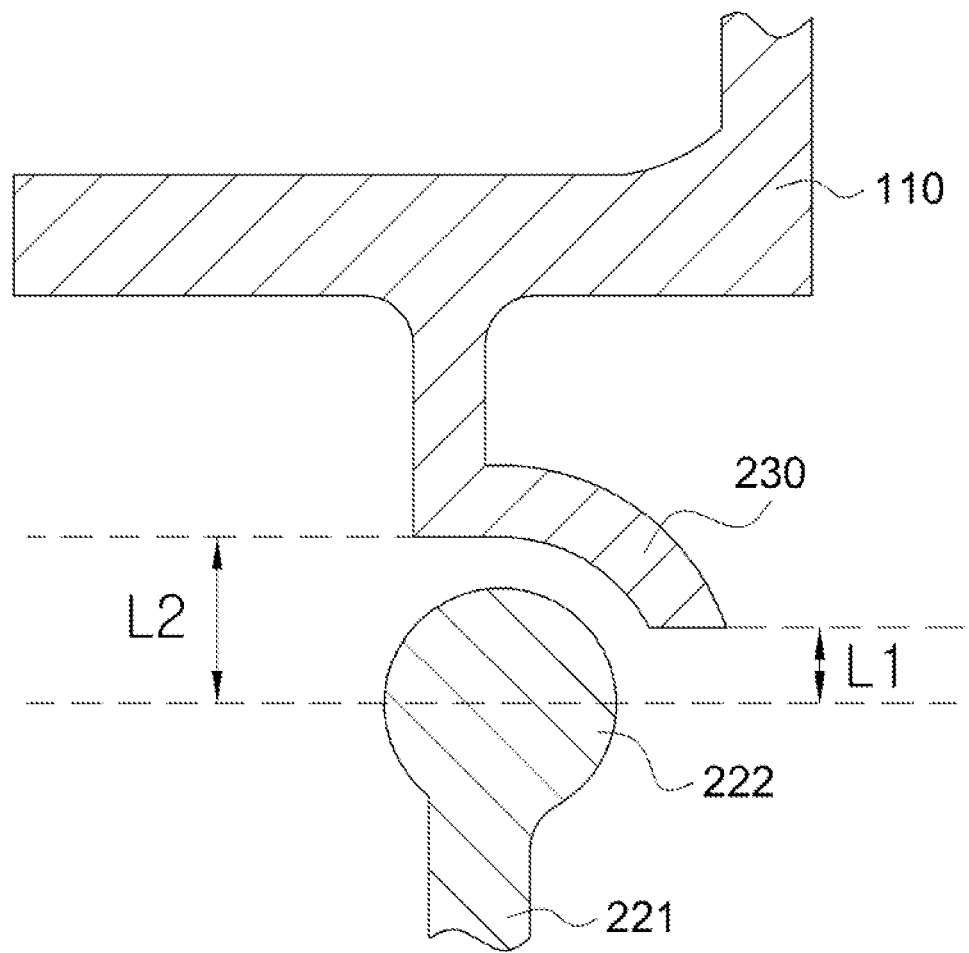
FIG. 12 is an enlarged fragmentary cross-sectional view of the valve assembly of FIG. 5, showing a blocking part of the valve assembly.

The cooling assembly 1000 further includes a valve assembly 200 including an air introduction part 210 formed in a closed part of the body 111, separate from the vent hole 116. The air introduction part 210 is configured to introduce the air into the heat exchanger at the time of driving the vehicle. The valve assembly 200 further includes a door part 220 disposed in the air introduction part 210. The door part 220 is configured for closing the air introduction part 210, so that the air introduced into the heat exchanger through the vent hole 116 of the body 111 does not flow backward through the air introduction part 210 at the time of stopping the vehicle. As shown in FIGS. 10-12, the air introduction part 210 further includes a blocking part 230 extended from the body 111 so as to enclose an upper portion of the door part 220 toward the front of the vehicle.

Figure 5:
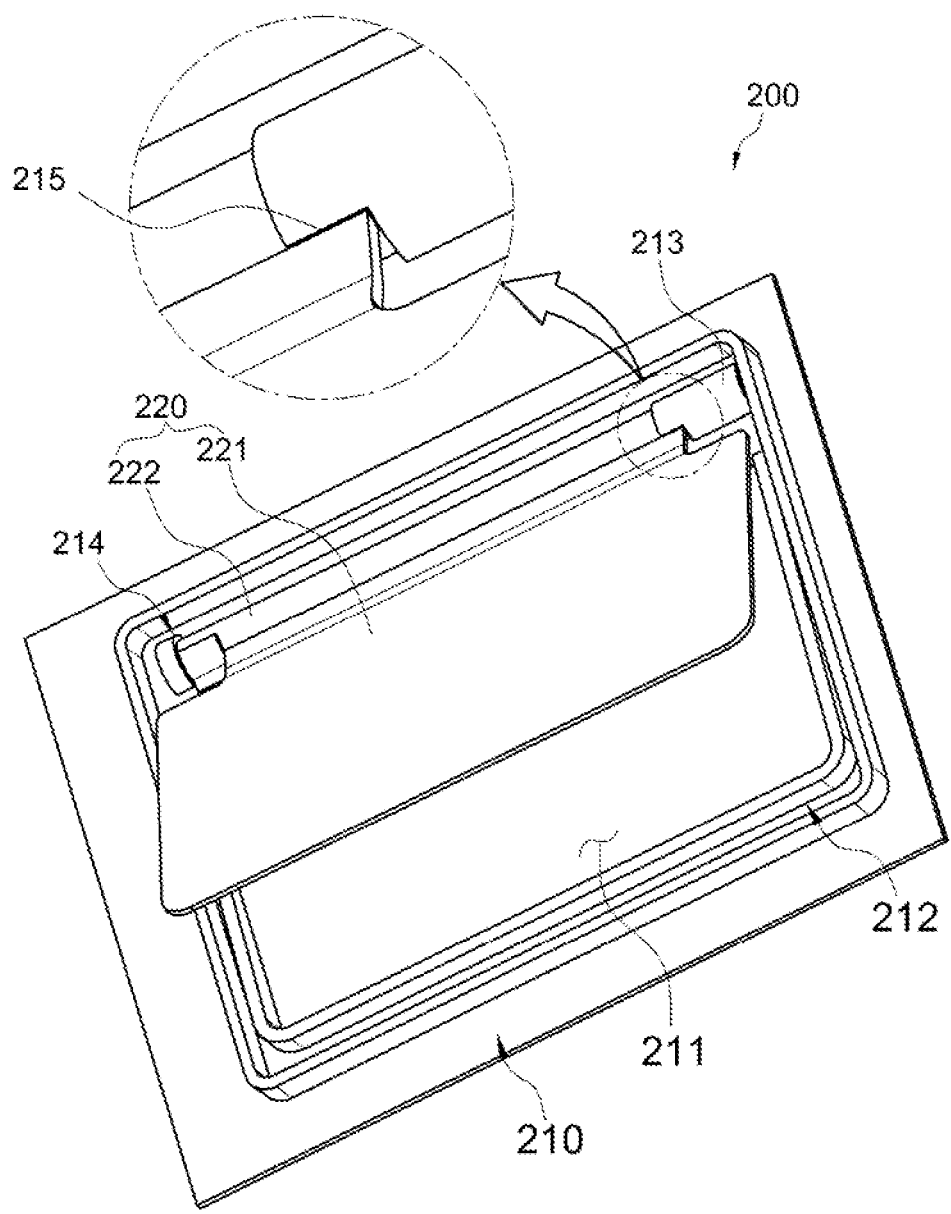
FIG. 5 is a perspective view of a valve assembly according to an embodiment of the present disclosure.
Figure 6:
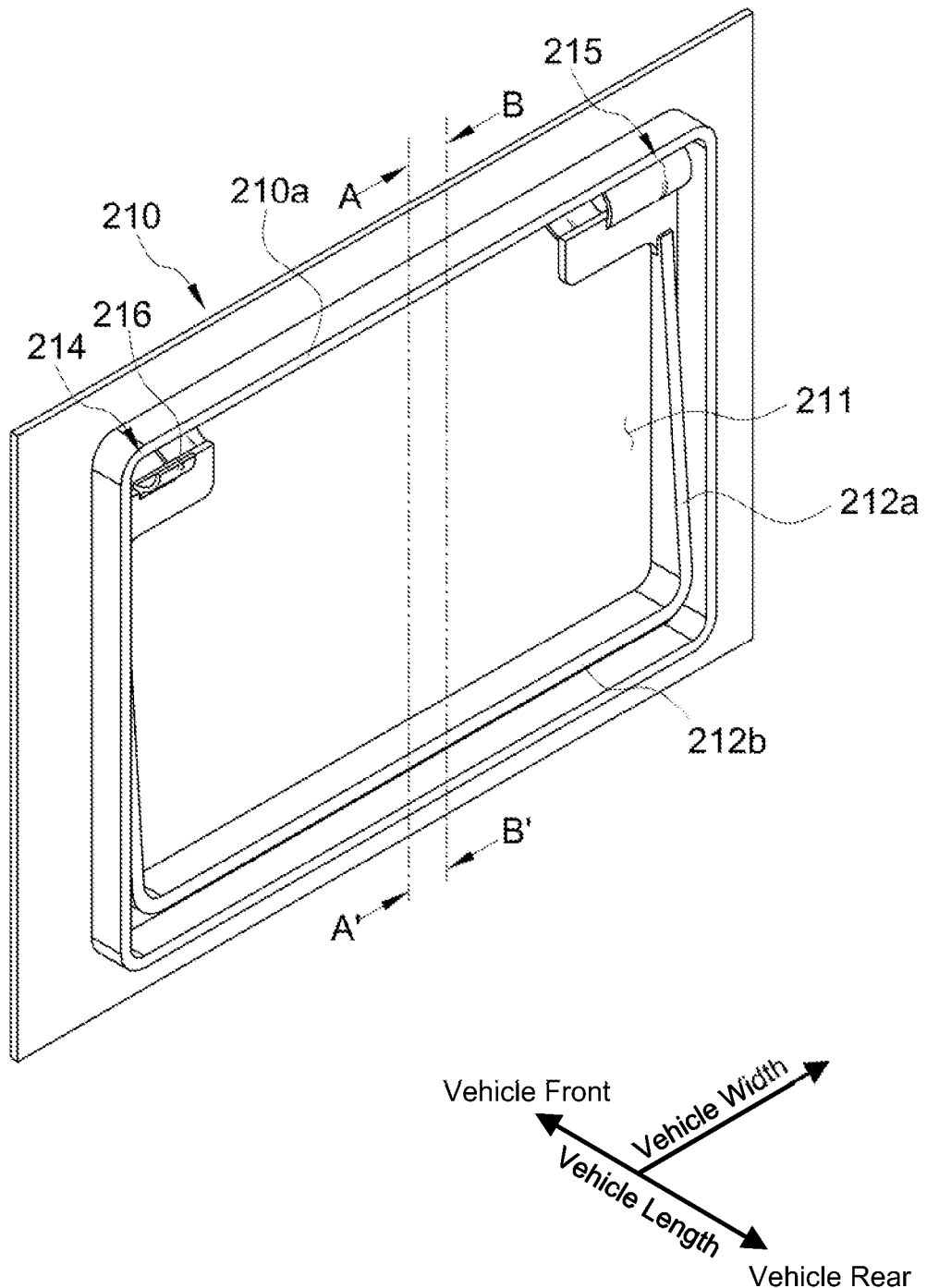
FIG. 6 is a perspective view of a valve assembly shown in FIG. 5, wherein a door part is removed for illustration.
Figure 7:
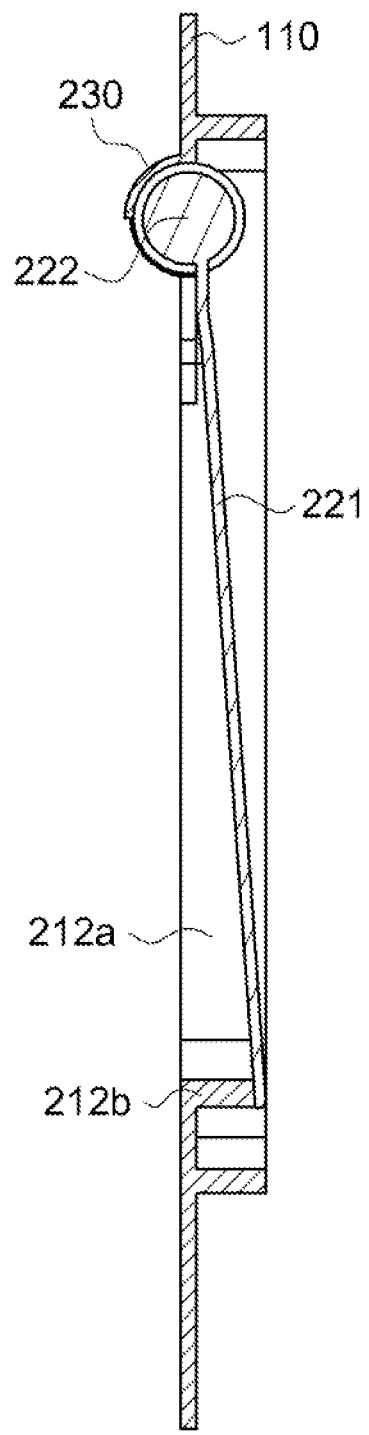
FIG. 7 is a cross-sectional view of the valve assembly of FIG. 5, wherein the door part is in a closed position.
Figure 8:
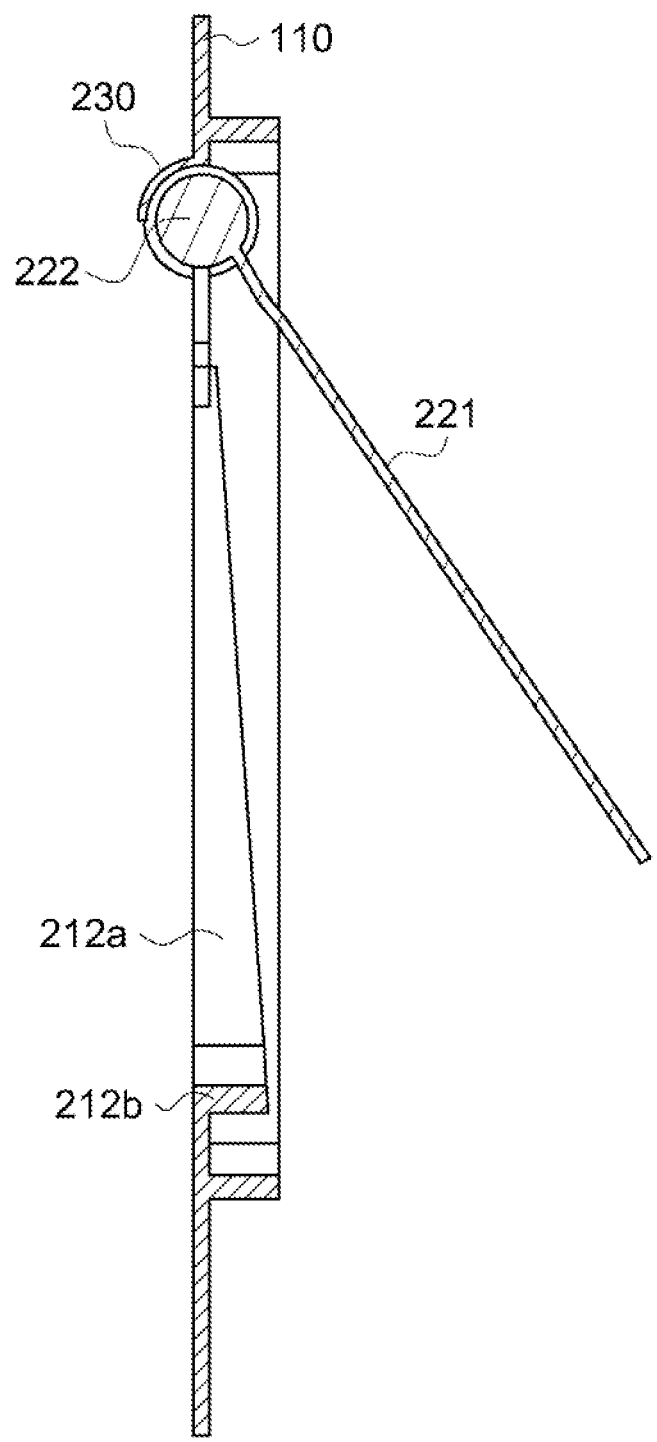
FIG. 8 is a cross-sectional view of the valve assembly of FIG. 5, wherein the door part is in an open position.
Figure 9:
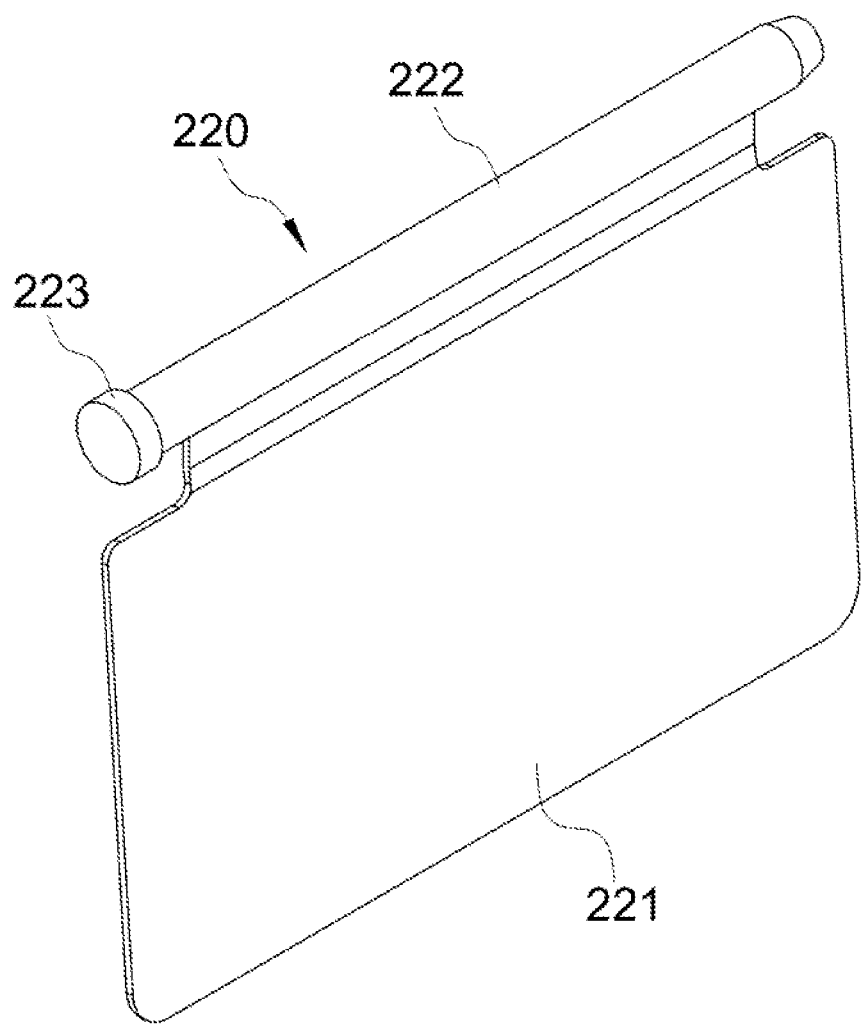
FIG. 9 is a perspective view of a door part according to an embodiment of the present disclosure.

FIG. 5 is a perspective view illustrating the valve assembly 200 of the cooling assembly 1000. FIG. 6 is a perspective view illustrating the air introduction part 210 of the cooling assembly 1000. FIG. 7 is a cross-sectional view illustrating the valve assembly 200 of the cooling assembly 1000 wherein a door 221 of the valve assembly 200 is closed. FIG. 8 is a cross-sectional view illustrating the valve assembly 200 of the cooling assembly 1000 the door 221 is opened. FIG. 9 is a perspective view illustrating the door part 220 of the cooling assembly 1000. FIG. 10 is a perspective view illustrating the valve assembly 200 of the cooling assembly 1000, wherein the door 221 is closed. FIG. 11 is a perspective view illustrating the valve assembly 200 of the cooling assembly 1000, wherein the door 221 is opened. FIG. 12 is an enlarged fragmentary cross-sectional view illustrating the blocking part 230 of the cooling assembly 100.

As illustrated in FIG. 5, the valve assembly 200 is configured to include the air introduction part 210 formed in a region separate from the vent hole 116 on the body 111, wherein the door part 220 is configured to open or close the air introduction part 210 depending on whether or not the driving wind is introduced.

Referring to FIGS. 5 through 8, the air introduction part 210 includes an air introduction hole 211 and a door contact part 212. The air introduction hole 211 penetrates through the body 111 in a length direction of the vehicle so that the driving wind is introduced. Although the case in which the air introduction hole 211 has a rectangular shape of which a width is longer than a height has been illustrated, a size and a shape of the air introduction hole 211 may be changed depending on a shape of the body 111 or a position of the body 111 in which the air introduction hole 211 is formed.

The door contact part 212 is formed along a perimeter of the air introduction hole 211, and may protrude from a surface of the air introduction part 210 toward the rear of the vehicle, wherein the door contact part 212 contacts a surface of the door 221 to close the air introduction hole 211.

In addition, the door contact part 212 may include a pair of side surface contact parts 212a formed at opposing sides of the air introduction hole 211, and a lower contact part 212b formed along a lower side of the air introduction hole 211. The lower contact part 212b is formed along a width direction of the vehicle and spans a distance between the pair of the side surface contact parts 212a.

The side surface contact parts 212a are formed at an incline with respect to the length direction of the vehicle. Here, as illustrated in FIGS. 7 and 8, the side surface contact parts 212a may be formed to have a protrusion length that increases toward a lower side of the vehicle. The lower contact part 212b may be formed to have a protrusion length corresponding to the protrusion length of a lower end of the side surface contact parts 212a, wherein the side surface contact parts 212a and the lower contact part 212b are continuously formed. This is to close the door 221 of the door part 220 in a state in which a lower end portion of the door 221 is inclined toward the rear of the vehicle by the door contact part 212. In the case in which the door 221 is closed so that the lower end portion thereof is inclined toward the rear of the vehicle, it is possible to prevent the door 221 from being opened at the time of vibrations of the vehicle, and it is possible to prevent the door 221 from being opened particularly even in the case in which the vehicle is stopped on an ascent road.

A first rotation coupling part 213 and a second rotation coupling part 214 are formed at opposing ends of an upper side of the air introduction hole 211. The first rotation coupling part 213 is rotatably coupled to a first end of a shaft 222 of the door part 220 and the second rotation coupling part 214 is rotatably coupled to an opposing second end of the shaft 222.

In addition, a door protecting part 210a is formed at an outer side of a perimeter surface of the door contact part 212 in order to prevent movement of the cooling assembly 1000, or damage to the door part 220 at the time of assembling the vehicle. The door protecting part 210a is formed adjacent a perimeter of the air introduction part 210. In more detail, the door protecting part 210a is formed to be spaced outwardly from a perimeter of the door contact part 212, and is extended toward the rear of the vehicle. A protrusion length of the door protecting part 210a may be longer than the protrusion length of the lower contact part 212b, wherein the door protecting part 210 extends beyond the door contact part 212. In more detail, when the door 221 contacts the door contact part 212, the door protecting part 210 is further extended toward the rear of the vehicle as compared with the door 221.

The first rotation coupling part 213 is formed at the upper side of the air introduction hole 211, and may be formed at a first end of the air introduction hole 211 in the width direction of the vehicle. The first rotation coupling part 213 is configured so that a first end of the shaft 222 is coupled thereto so as to be freely rotatable within the first rotation coupling part 213. The first rotation coupling part 213 may be formed in a closed ring shape so that the second end of the shaft 222 is fitted thereinto in an axial direction of the shaft 222.

The second rotation coupling part 214 is formed at the upper side of the air introduction hole 211, and may be formed at a second end of the air introduction hole 221 in the width direction of the vehicle. The second rotation coupling part 214 is configured so that the second end of the shaft 222 is coupled thereto so as to be freely rotatable within the second coupling part 214. The second rotation coupling part 214 may be formed in a partial ring shape, wherein an opening part 216 is formed in a circumference of a sidewall of the second rotation coupling part 214 so that the shaft 222 is received by the second rotation coupling part 214 in a radial direction of the second rotation coupling part 214. A width across the opening part 216 may be smaller than a diameter of the shaft 222, wherein the shaft 222 is snap-fit into the second coupling part 214 by applying a force to urge the shaft 222 through the opening part 216. The snap-fit advantageously prevents inadvertent dislocation of the shaft 222 from the second rotation coupling part 214 when the assembling of the door part 220 is completed.

Accordingly, the door part 220 may be simply assembled to the air introduction part 210 through the first rotation coupling part 213 and the second rotation coupling part 214.

In detail, the first end of the shaft 222 of the door part 220 is fitted into the first rotation coupling part 213 in the axial direction of first rotation coupling part 213, and the second end of the shaft 222 of the door part 220 is snapped through the opening part 216 and into the second rotation coupling part 214 in the radial direction of the shaft 222 of the second rotation coupling part 214, thereby making it possible to complete the assembling of the door part 220.

In addition, the first rotation coupling part 213 may be provided with a stopper 215 configured to limit a rotation the shaft 222 so that the door 221 is not opened beyond a predetermined angle.

Referring to FIGS. 5 and 9, the door part 220 is configured to include the shaft 222 coupled to an upper side of the air introduction part 210 and rotated about the axial direction of the shaft 222 to control the door 221 to be closed or opened. The door 221 is formed below the shaft 222 and is caused to close or open the air introduction hole 211 by the rotation of the shaft 222.

Here, the door 221 is provided on a surface of the body 111 toward the rear of the vehicle so as to be opened by the driving wind introduced from the front of the vehicle, and may be formed to be opened toward the rear of the vehicle.

In addition, the door 221 may have a cross-sectional area larger than a cross-sectional area of the air introduction hole 211 to prevent passage of the door 221 through the air introduction hole 211, wherein the door 221 cannot be opened toward the front of the vehicle by air introduced from the rear of the vehicle. Therefore, the door 221 may be configured to pass only air introduced from the front of the vehicle therethrough, and block the air introduced from the rear of the vehicle.

For the purpose of the configuration as described above, the shaft 222 formed above the door 221 may be coupled to the first rotation coupling part 213 and the second rotation coupling part 214 of the air introduction part 210 so as to be freely rotatable.

In addition, a head part 223 having a diameter larger than that of the shaft 222 may be formed at the second end of the shaft 222. Here, the diameter of the head part 223 is larger than an inner diameter of the first rotation coupling part 213 to prevent the second end of the shaft 222 from being fitted into the first rotation coupling part 213 in the axial direction. Therefore, the head part 223 of the shaft 222 prevents the door part 220 from being misassembled.

As illustrated in FIGS. 7, 8, and 10 to 12, the valve assembly 200 of the cooling assembly 1000 further includes the blocking part 230 extended from the body 111 so as to enclose the upper portion of the door part 220 toward the front of the vehicle.

The blocking part 230 is extended from the body 111 of an upper end of the air introduction hole 211 in a downward direction so as to enclose the upper portion of the door part 220 toward the front of the vehicle.

That is, in the valve assembly 200, after the shaft 222 is assembled to an upper portion of the air introduction part 210 so as to be freely rotatable, the door part 220 falls in a downward direction by gravity, such that a vertical gap is generated along a horizontal direction between the body part 111 and the door part 220.

That is, in the valve assembly 200, the vertical gap is generated along the horizontal direction between the body part 111 and the door part 220 by the gravity, and air is leaked through the gap, such that a wind amount performance is deteriorated.

Therefore, the valve assembly 200 includes the blocking part 230 enclosing the upper portion of the door part 220 toward the front of the vehicle to prevent the vertical gap from being formed along the horizontal direction between the body 111 and the door part 220, thereby making it possible to minimize the air leaked through the gap.

Here, the blocking part 230 is formed so that a first distance L1 from the center of the shaft 222 to a distal portion of the blocking part 230, at the front of the vehicle, is smaller than a second linear distance L2 from the center of the shaft 222 to the uppermost end of the blocking part 230 at the rear of the vehicle, as illustrated in FIG. 12.

That is, the blocking part 230 is extended in the downward direction so that the first linear distance L1 at the front of the vehicle is smaller than the second linear distance L2 at the rear of the vehicle to block the gap in the horizontal direction, thereby making it possible to minimize the air leaked through the gap and prevent the wind amount performance from being deteriorated.

The cooling assembly 1000 according to the instant disclosure improves air-blowing efficiency through rotation of the fan 114 at the time of stopping the vehicle, improves both of air-blowing efficiency and driving wind introduction efficiency of the vehicle through an increase in an amount of introduced driving wind at the time of driving the vehicle, and improves cooling efficiency of the heat exchanger at the time of stopping the vehicle and at the time of driving the vehicle.

Particularly, the door part 220 mounted on the shroud body 111 is configured so as to be assembled in a one-touch scheme, such that an assembly process is simplified, thereby improving productivity.

In addition, the door part 220 is configured so as not be assembled in a reverse direction, such that assembly quality is improved.

Further, in the cooling assembly 1000, the gap between the shroud 100 and the valve assembly 200 is covered to minimize the air leaked through the gap, thereby making it possible to prevent the deterioration of the wind amount performance due to the leakage of the air.

The present disclosure is not to be construed as being limited to the above-mentioned embodiment. The present disclosure may be applied to various fields and may be variously modified by those skilled in the art without departing from the scope of the present disclosure claimed in the claims. Therefore, it is obvious to those skilled in the art that these alterations and modifications fall in the scope of the present disclosure.

What is claimed is:

1. A valve for a cooling assembly of a vehicle, comprising:
    an air introduction part disposed on a body of a shroud and including an air introduction hole formed through the body; and
    a door part configured to selectively move between an open position and a closed position to open and close the air introduction hole, the door part including a shaft and a door fixedly coupled to the shaft, the shaft coupled to the air introduction part to be freely rotatable by a first rotation coupling part and a second rotation coupling part, the first rotation coupling part configured to axially receive a first end of the shaft and the second rotation coupling part configured to radially receive a second end of the shaft, wherein the door is selectively moved between the open position and the closed position by rotation of the shaft formed above the door according to driving wind, wherein the first rotation coupling part is a closed ring, and the second rotation coupling part is a partial ring having an opening part formed therein, and wherein a head part having a diameter larger than a diameter of the shaft is integrally formed with the shaft at the second end of the shaft, the diameter of the head part being larger than an inner diameter of the first rotation coupling part.

2. The valve for a cooling assembly of a vehicle of claim 1, wherein the opening part is configured to receive the second end of the shaft therethrough.

3. The valve for a cooling assembly of a vehicle of claim 1, wherein the air introduction hole is configured to prevent passage of the door through the air introduction hole.

4. The valve for a cooling assembly of a vehicle of claim 1, wherein the air introduction part includes a door contact part protruding from a surface forming a perimeter of the air introduction hole and configured to abut the door when the door is in the closed position.

5. The valve for a cooling assembly of a vehicle of claim 4, wherein the door contact part includes a pair of inclined side surface contacts formed on opposing sides of the air introduction hole, and a lower contact part formed along a lower side of the air introduction hole, the lower contact part spanning a distance between the side surface contacts.

6. The valve for a cooling assembly of a vehicle of claim 4, wherein the air introduction part includes a door protecting part spaced outwardly from and bounding the door contact part, the door protecting part extending beyond the door contact part, wherein the door is contained within a perimeter of the door protecting part when the door is in the closed position.

7. The valve for a cooling assembly of a vehicle of claim 1, further comprising a blocking part formed on the air introduction part, the blocking part configured to enclose a gap formed intermediate the air introduction part and the door part.

\* \* \* \* \*